United States Patent [19]

Klotz et al.

[11] 4,076,279
[45] Feb. 28, 1978

[54] PLUG-IN COUPLING

[75] Inventors: Heinz Klotz, Dortmund-Syburg; Dietmar Podszuck, Wuppertal, both of Germany

[73] Assignee: Hermann Hemscheidt Maschinenfabrik, Germany

[21] Appl. No.: 725,942

[22] Filed: Sep. 23, 1976

[30] Foreign Application Priority Data

Sep. 23, 1975 Germany .............................. 2542284

[51] Int. Cl.² ............................................ F16L 35/00
[52] U.S. Cl. ................... 285/26; 285/137 R; 285/305
[58] Field of Search ...................... 285/26, 25, 29, 28, 285/137 R, 24, 27, 305, 91, 81, 403, 404; 339/75 MP, 75 P; 403/324, 316, 317

[56] References Cited

U.S. PATENT DOCUMENTS

| 28,221 | 5/1960 | Warren | 285/403 |
|---|---|---|---|
| 3,214,195 | 10/1965 | Zahuranec et al. | 285/137 R |
| 3,527,485 | 9/1970 | Goword et al. | 285/305 |
| 3,701,549 | 10/1972 | Koomey | 285/24 |
| 3,767,234 | 10/1973 | Weirich | 285/305 |
| 3,889,986 | 6/1975 | Cheshir et al. | 285/305 |

Primary Examiner—Dave W. Arola
Attorney, Agent, or Firm—Berman, Aisenberg & Platt

[57] ABSTRACT

A multiple-passage plug-in coupling for releasably connecting hose or pipe ends, the coupling comprising: a first coupling part, nipples on that part, a second coupling part, sleeves in the second coupling part to receive the said nipples, guide projections on one of said coupling parts, corresponding guide recesses to receive the said projections in the other one of said coupling parts, channels in the said projections and the said other coupling part, and a releasable locking member received by the said channels and serving to lock the two coupling parts together.

4 Claims, 4 Drawing Figures

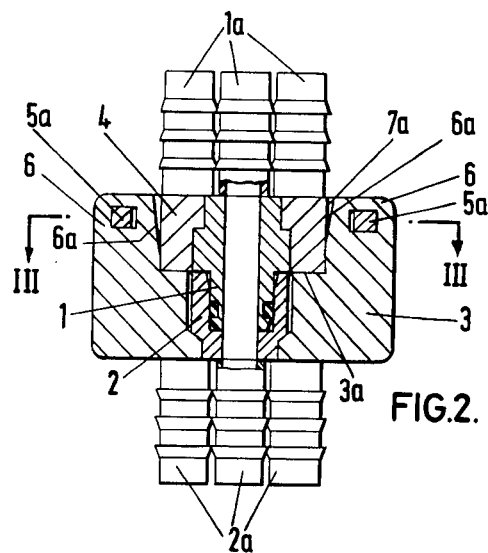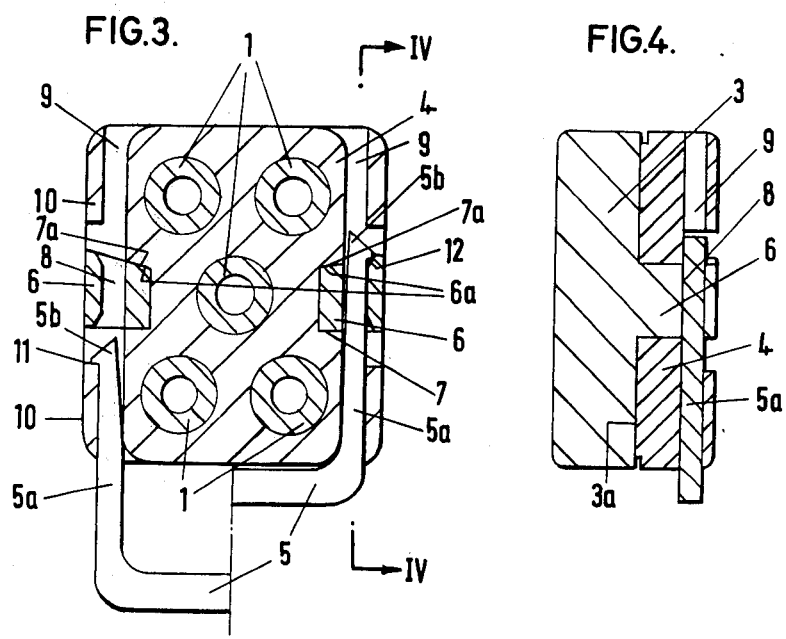

PLUG-IN COUPLING

This invention relates to a multiple-passage plug-in coupling for releasably connecting hose or pipe ends.

The aim of the invention is to provide a multiple-passage plug-in coupling which is of simple construction, is compact, and can be used easily and reliably even in places which are difficult of access.

With this aim in view, the invention is directed to a multiple-passage plug-in coupling comprising one coupling part provided with nipples which are plugged into corresponding sleeves or holes provided in a second coupling part, in which one of the coupling parts has guide pins or other projections which are received in corresponding guide recesses in the other coupling part, and said projections and the said other coupling part each have channels which receive a releasably locking member serving to lock the two coupling parts together.

In one advantageous embodiment of the invention, the pins or other projections and the corresponding recesses which receive them are disposed non-centrally on their respective coupling parts. In addition, the pins or other projections are preferably provided with inclined guide surfaces and are longer than the projecting portions of the nipples.

An example of a coupling in accordance with the invention is shown in the accompanying drawing, in which:

FIG. 2 is a view similar to FIG. 1 but with the upper part of the coupling plugged into the lower part;

FIG. 3 is a section taken on the line III-III in FIG. 2; and

FIG. 4 is a section taken on the line IV-IV in FIG. 3.

Figure 1:
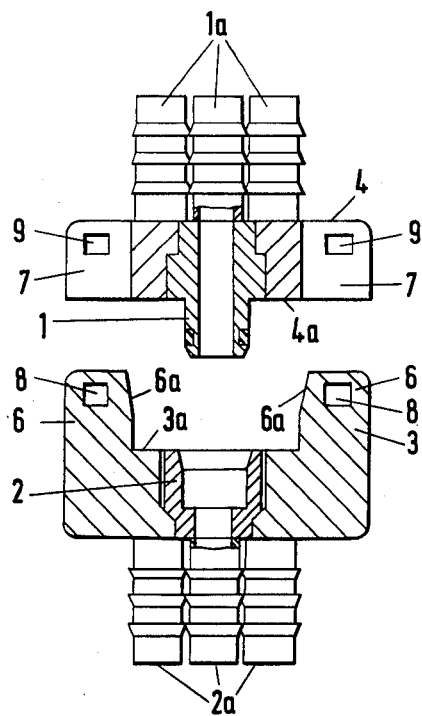
FIG. 1 is a vertical cross-section through the coupling prior to the two main parts of the coupling being brought together.

The multiple-passage plug-in coupling shown in the drawing is intended to releasably connect up to five hose or pipe ends to another five ends. For this purpose, five nipples 1 and five nipple-receiving sleeves 2 are provided on the two rectangular-shaped coupling parts 3 and 4 respectively. The nipples 1 have pipe-receiving portions 1a, while the sleeves 2 have pipe-receiving portions 2a. When the two coupling parts 3 and 4 are brought together from the position shown in FIG. 1 to the position shown in FIG. 2, the nipples 1 will enter the sleeves 2.

To guide the movement of the coupling parts towards one another, the coupling part 3 has two oppositely-located guide pins 6 which project from the flat surface 3a of the said part and are disposed non-centrally thereon. The projecting pins 6 have inclined insertion-guiding slopes 6a and engage in corresponding guide recesses 7 in the coupling part 4, the recesses 7 having inclined walls 7a matching the sloping surfaces 6a of the pins 6. In addition, as shown in FIG. 1, the pins 6 are longer than the portions of the nipples 1 projecting from the flat surface 4a of the coupling part 4 so as to ensure that the coupling parts 3 and 4 are exactly centred and guided when they are brought together, before the nipples 1 plug into the sleeves 2.

The pins 6 are formed with through-channels 8 which, when the parts 3 and 4 have been brought together, open into and are aligned with similar channels 9 in the coupling part 4. The two limbs 5a of a releasable U-shaped locking member 5 can then be introduced into the channels 8 and 9 so as to lock the two coupling parts 3 and 4 together. The outer walls 10 of the channels 9 are interrupted adjacent the guide recesses 7 so that, when the U-shaped locking member 5 is pulled back into the position shown on the left-hand side of FIG. 3, outwardly-directed latch surfaces 5b at the free ends of the limbs 5a abut shoulders 11 formed by the interrupted outer walls 10 and thus prevent the locking member from becoming entirely detached from the coupling part 4 while allowing the two couplings 3 and 4 to be separated from one another. When the locking member 5 is pushed inwards into the locking position shown on the righthand side of FIG. 3, the latch surfaces 5b engage bevelled edges 12 on the pins 6 in a resilient manner, thereby holding the locking member 5 against accidental withdrawing movement.

The multiple-passage plug-in coupling described above is therefore of simple construction and small dimensions, and is easy to operate. As indicated already, the pins 6 are used for centering and joining the two parts 3 and 4 together in a foolproof manner, and they also cooperate with the locking member 5 to transmit forces from one coupling part to the other.

Prior to the coupling-together of the two parts 3 and 4, the locking member 5 is pulled outwards until the latch surfaces 5b at the free ends of the limbs 5a engage the shoulders 11 formed in the interrupted walls 10 of the channels 9. The guide recesses 7 are now free to receive the pins 6. Since the pins 6 are disposed non-centrally on the flat surface 3a of the part 3 and are longer than the projecting portions of the nipples 1, the two coupling parts 3 and 4 are centred with respect to one another by the pins 6 and the recesses 7 before the nipples 1 are plugged into the sleeves 2. This prevents the coupling parts from being connected together in the wrong way and also prevents the individual hose and pipe connections from twisting when they are joined together.

The coupling is locked by then pushing-in the locking member 5, whereupon the latch surfaces 5b of the latter resiliently engage the bevelled edges 12. This means that the locking member cannot come out as a result, for example, of vibration.

The coupling is eventually disconnected simply by pulling the locking member 5 outwards.

We claim:

1. A multiple-passage plug-in coupling for releasably connecting hose or pipe ends, the coupling comprising: a first coupling part, longitudinally-extending parallel nipples on that part, a second coupling part, longitudinally extending parallel sleeves in the second coupling part to receive the said nipples when the said two coupling parts are plugged together by a simple, axial, non-rotary movement, two guide projections disposed non-centrally on one of said coupling parts, two corresponding guide recesses to receive the said two projections disposed non-centrally and at opposite locations in the other one of said coupling parts, channels in the said projections, further channels in the said other coupling part, said channels in the guide projections being in alignment with said channels in the said other coupling part when said first and second coupling parts are plugged in together, a U-shaped locking member slidably disposed in said channels of said other coupling part and being slidable into and beyond said channels in the said two projections whereby to lock said first and second coupling parts together, shoulders forming interruptions in said channels of said other coupling part adjacent said two guide recesses, and outwardly-directed latch surfaces at the free ends of the U-shaped locking member adapted to engage said shoulders and thereby prevent said locking member from becoming entirely detached from said other coupling part while allowing said U-shaped locking member to be movable to a position where the latter is clear of said channels in the said projections to allow said first and second coupling parts to be unplugged from each other.

2. A coupling according to claim 1, in which, when the locking member is in a locking position where it passes through said channels in the said two projections, the latch surfaces on the locking member engage bevelled edges on the said two guide projections in a resilient manner, thereby holding the locking member against accidental movement.

3. A coupling according to claim 1, in which the said projections have inclined guide surfaces.

4. A coupling according to claim 1, in which the said projections are longer than the nipples.

* * * * *